United States Patent [19]

Romero et al.

[11] Patent Number: 5,726,639
[45] Date of Patent: Mar. 10, 1998

[54] METHOD AND DEVICE FOR OFF HOUR OVER THE AIR SOFTWARE PROGRAMMING OF SELECTIVE CALL RECEIVERS

[75] Inventors: Osvaldo Romero, Miami; Frank Fernandez, Boynton Beach, both of Fla.

[73] Assignee: Motorola, Inc., Schaumburg, Ill.

[21] Appl. No.: 521,405

[22] Filed: Aug. 30, 1995

[51] Int. Cl.[6] .............................. G08B 3/10; H04B 7/00; H04L 7/00
[52] U.S. Cl. .............................. 340/825.22; 340/825.44; 455/38.2; 455/352
[58] Field of Search ................ 340/825.22, 825.44, 340/825.69, 825.72; 455/38.2, 68, 70, 352; 45/38.2, 352

[56] References Cited

U.S. PATENT DOCUMENTS

| | | | |
|---|---|---|---|
| 4,839,628 | 6/1989 | Davis et al. | 340/311.1 |
| 4,879,758 | 11/1989 | DeLuca et al. | 455/296 |
| 5,001,471 | 3/1991 | Snowden et al. | 340/825.21 |
| 5,376,975 | 12/1994 | Romero et al. | 340/825.44 |
| 5,418,524 | 5/1995 | Fennell | 340/825.22 |
| 5,459,456 | 10/1995 | Hosack et al. | 340/825.44 |
| 5,495,233 | 2/1996 | Kawashima et al. | 340/825.21 |
| 5,561,702 | 10/1996 | Lipp et al. | 379/57 |

Primary Examiner—Michael Horabik
Assistant Examiner—Yonel Beaulieu
Attorney, Agent, or Firm—Philip P. Macnak

[57] ABSTRACT

A selective call receiver (10) utilizes a method for performing over-the-air software programming when the selective call receiver (10) is on or switched off by a user. A first selective call signal is received and programming related information including an anticipated time of transmission of a second selective call signal is received. The selective call receiver (10) is prepared to receive the second selective call signal in response to the programming related information received, whereby the receiver circuitry (30) is energized at the anticipated time of transmission to receive the second selective call signal. The selective call receiver (10) is further switched on at the anticipated time of transmission of the second selective call signal, and the receiver circuitry (30) is energized to receive the second selective call signal when the user has switched off the selective call receiver (10) prior to the anticipated time.

12 Claims, 4 Drawing Sheets

METHOD AND DEVICE FOR OFF HOUR OVER THE AIR SOFTWARE PROGRAMMING OF SELECTIVE CALL RECEIVERS

FIELD OF THE INVENTION

This invention relates generally to selective call receivers, and more particularly, to a system and method for automatically performing airway software upgrades in pagers and pager like devices at predetermined times for conserving battery power, increasing the probability of effectuating software changes and improving the efficiency of radio carriers.

BACKGROUND OF THE INVENTION

Selective call receivers, such as pagers, are devices for receiving electronic messages, also called pages or selective call signals. The transmitted selective call signals are sent by an originator to a portable target device at a predetermined address assigned to the selective call receiver and demodulated, decoded and processed by a processor to generate a user readable message displayed for viewing. The processor also accepts user inputs via user controls, acts upon the inputs, activates an alarm to alert the user/owner of incoming messages, and stores and accesses information and messages in nonvolatile memory. As is appreciated by those skilled in the art, other major components in a selective call receiver include radio frequency (RF) receiver circuitry for receiving and demodulating selective call signals and protocol information; preamble and sync code detection circuitry to process the protocol preamble and synchronization code words, respectively, by correlating a known preamble bit pattern with the demodulated signal and by framed synchronization with a periodically imported sync code to maintain synchronized communication; address correlating circuitry for comparing address information in the demodulated signal with a predetermined address of the receiver; baud rate detection circuitry for generating a signal that indicates the symbol or baud rate of the signal; internal timing controls; and nonvolatile memory locations for storing select information in the absence of power.

The components selected in conventional selective call receiver circuitry designs are typically low energy consuming components. Low powered components are preferred since there exists an ongoing challenge in pager and portable communications technology to conserve battery power, to extend battery life and to minimize the size of the battery source required for weight and dimensional reasons. Not all of the circuitry in a selective call receiver can utilize low energy consumption components due to desired performance characteristics. For instance, the RF receiver circuitry still uses high energy consuming components. Accordingly, other methods and systems are incorporated in pager architecture to minimize power consumption. One such method and apparatus includes the battery saving circuit disclosed in U.S. Pat. No. 5,376,975, commonly assigned to the assignee of the present invention. Since the receiver circuit requires high energy consuming components and can not be continually active, the receiver is selectively energized to guarantee that it receives the synchronization word code (sync code) of a transmitted page and is deactivated for a predetermined amount of time while the sync code is processed and correlated by the selective call receiver to conserve power. The battery saving circuit provides a signal to a receiver circuit to periodically energize and deenergize the receiver circuit. The battery saving circuit receives periodic inputs from the processor to periodically activate and deactivate the receiver circuit at predetermined rates based on the occurrence of the events responsive to signals from the sync code detector, the address correlator and the baud rate detector. However, the receiver circuitry and battery saver can only work when the selective call receiver, or pager, is powered, or in the "on mode." If the selective call receiver is not energized, then it cannot receive any selective call signals and users typically power down their units during off-peak hours, that is between 11 p.m. and 5 a.m., to conserve valuable battery power.

The problem associated with removing power from selective call receiver is that the receiver is also de-energized such that selective call signals cannot be received by the device. Signals received by selective call receivers include small, user specific messages, as well as larger signals for implementing programming changes and software upgrades to the selective call receiver. The type of programmable call receiver upgrades and changes being done over the air (OTA) may be found in U.S. Pat. No. 4,839,628 to Davis, et al, issued Jun. 13, 1989 and include reprogramming memory (RAM, FLASH, EEPROM and the control ROM) with software upgrades; changing variables, memory parameters, applications and executables; adding data features such as real estate, sports and stock market files; and interrupting service to the device. The problem is that OTA changes to the selective call receiver device tend to be large and, as such, interfere with receiving personal user specific messages. In addition, the selective call device cannot receive required programming changes and upgrades unless the receiver is left activated.

Although selective call receivers are becoming increasingly sophisticated in their ability to do OTA software upgrades, a major drawback still exists in radio carrier capacity. Pager OTA programming upgrades can be long and time consuming even with high speed protocols, such as POCSAG or FLEX, especially during high traffic times. In addition, OTA programming renders the device unavailable for other incoming messages and must be performed while the device is in the "on mode." Since peak time traffic is already high, doing OTA software upgrades during peak hours chokes the RCC's system which decreases the probability of having a successful upgrade and decreases the overall efficiency of controlling radio communication traffic.

Consequently, OTA software upgrade programming should be done during the off peak hours, such as 11 p.m. to 5 a.m., so as to not interfere with normal air traffic and to better effectuate processing. Most selective call receiver devices, however, are placed in the off mode late at night and during the low peak hours to conserve and extend battery life. Therefore, implementing off peak hour software upgrades requires the device be "on" at all times which requires a trade off with overall battery life. Since conserving battery power is essential, off-peak OTA programming is not necessarily a viable solution. While devices such as battery saving circuits periodically deactivate the receiver to reduce energy consumption, it does not have the ability to reactivate the receiver circuitry for receiving OTA software upgrades when the device is off. In addition, coordinating device subscribers and control centers for processing OTA off peak hours programming does not offer a practical solution. Accordingly, there exists a need for a method and system for allowing selective call receiver devices to be automatically upgraded with OTA software changes when the device is in the off mode so that upgrades may be implemented during the off peak hours without forfeiting battery life. Such a system would allow users to deactivate their devices when not in use during the late night or low peak hours to conserve battery power, yet enable them to still receive OTA software upgrades.

SUMMARY OF THE INVENTION

Accordingly, the present invention provides a selective call receiver device and method for implementing OTA software upgrades in selective call receiver devices during predetermined times such as off-peak air communication hours. The instant invention is designed to allow the device to be placed in the power off mode and yet receive OTA software upgrades without user intervention. This allows the device to be turned off during the off-peak hours to conserve battery power and then automatically reactivated to receive software upgrades in a manner transparent to the device owner.

In accordance with an embodiment of the present invention, a method for performing over-the-air software programming of a selective call receiver which can be switched off at any time by a user, the over-the-air software programming being independent of and transparent to an action by the user, the selective call receiver including receiver circuitry for receiving and demodulating selective call signals, said method comprising the steps of:

(a) receiving a first selective call signal intended for the selective call receiver;

(b) detecting, within the first selective call signal, predetermined programming related information which includes an anticipated time of transmission of a second selective call signal;

(c) preparing the selective call receiver to receive the second selective call signal in response to the programming related information;

(d) receiving the second selective call signal in response to said step of preparing at the anticipated time of transmission of the second selective call signal; and (e) switching the selective call receiver on at the anticipated time of transmission of the second selective call signal to receive the second selective call signal when the user has switched off the selective call receiver prior to the anticipated time.

In accordance with another aspect of the present invention, a selective call receiver which can be switched off at any time by a user and which can be programmed over-the-air independent of and transparent to an action by a user comprises receiver circuitry, a processor, timing control means and energizing circuitry. The receiver circuitry receives and demodulates selective call signals, including a first selective call signal which delivers programming related information which includes an anticipated time of transmission of a second selective call signal. The processor is coupled to the receiver circuitry and for detects the anticipated time of transmission of the second selective call signal within the programming related information. The timing control means is coupled to the processor and is responsive to the anticipated time of transmission for generating a control signal in response to an occurrence of the anticipated time of transmission of the second selective call signal. The energizing circuitry selectively energizes the receiver circuitry in response to the control signal for enabling the receiving and demodulating of the second selective call signal. The energizing circuitry further switches on the selective call receiver and selectively energizes the receiver circuitry for enabling the receiving and demodulating the second selective call signal when the user has switched off the selective call receiver prior to the anticipated time.

DESCRIPTION OF THE PREFERRED EMBODIMENT

Referring to FIGS. 1–4, the selective call receiver 10 and method for OTA programming 100 in accordance with the present invention are depicted. The embodiments of the instant invention provide a selective call receiver 10 and method 100 for receiving selective call signals, including control pages and OTA software upgrade programs, that automatically perform software program upgrades in the device. The system of the instant invention comprises a receiving means including a receiver circuitry 12, a timing means including a time correlator 26, and a nonvolatile internal timer 24, sync detector circuitry 18, baud rate detector or detecting means 14, nonvolatile memory 32, flash RAM memory 28 EEPROM, STATIC RAM and an address correlation means including a control page address correlator 20 for correlating control page address information with selective call receiver address information.

Figure 4:
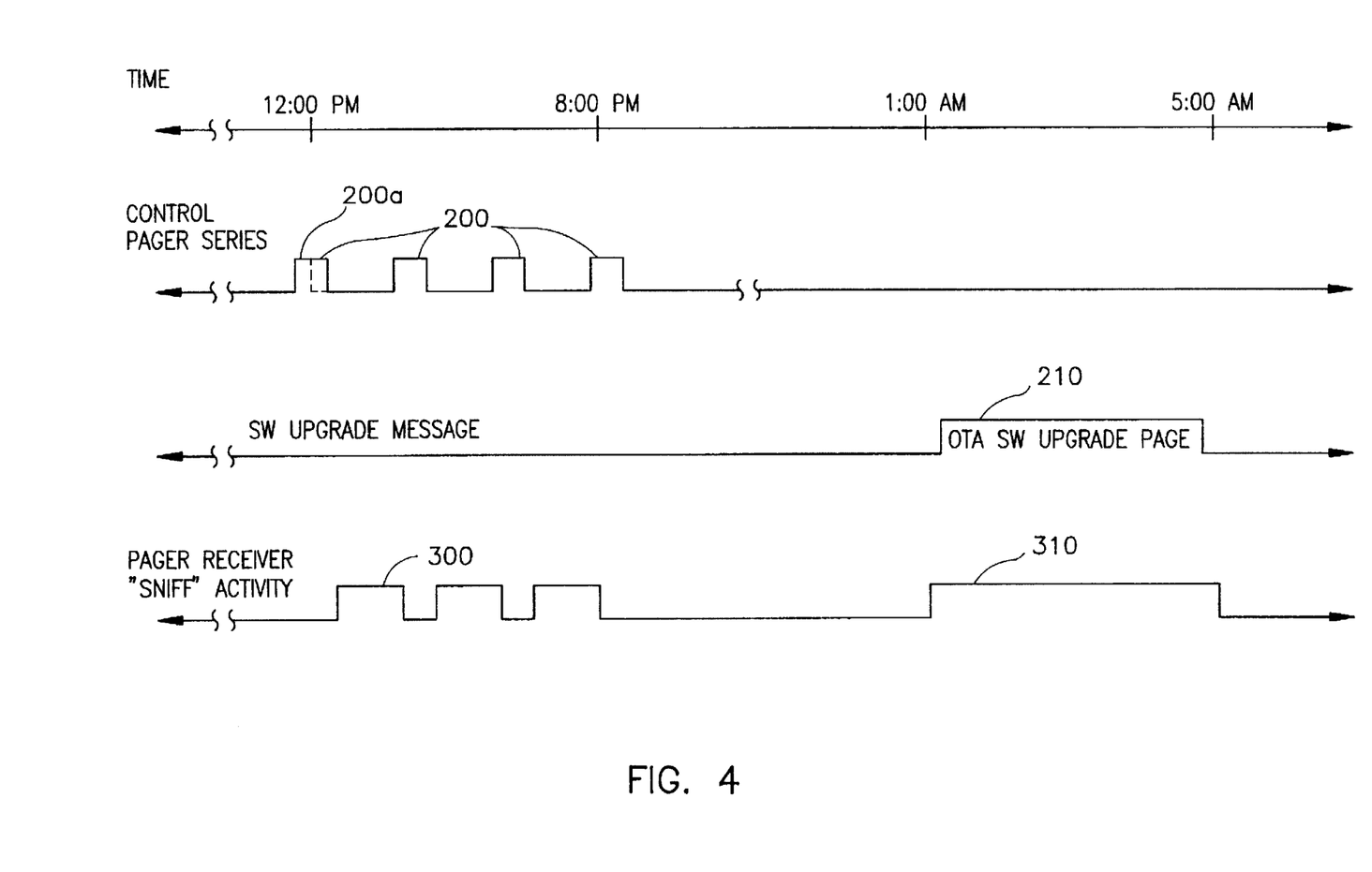
FIG. 4 illustrates timing diagrams of the automatic OTA software programming of the selective call receivers showing the control page transmission and OTA program transmission in accordance with an embodiment of the instant invention.

In the system of the present invention, the selective call receiver 10 receives selective call signals which includes first selective call signals having device programming related information, such as, the anticipated transmission time of the second selective call signals which include the actual OTA software program upgrades. Accordingly, the device can prepare itself to receive the program upgrade signals at the anticipated time without user involvement. The series of control page data words are transmitted via conventional radio communication carrier means from the signal call receiver's control center, local or otherwise, at different times of the day as shown in FIG. 4. The times of control page transmission may be predetermined and scheduled for transmission during or close to the peak hours of airway traffic when the selective call receivers are normally "on" to ensure reception. The control page 200 is intended to include the information required to schedule an OTA software program upgrade so as to utilize little overhead. That is, the control page 200 is designed for low overhead, limiting itself to program time, address information and size information, so that it does not interfere with the current flow of radio carrier traffic. The control page 200 can also hit multiple pagers with the same data by indicating codes and times of programming so as to prompt the pagers that will be receiving the same upgrades with the control page 200. Thus, the instant invention prompts at least one selective call receiver that an over the air software upgrade page 210, herein after refereed to as an OTA software upgrade page 210 will be implemented at a predetermined time without interfering with peak hour traffic. Each of the control page words may be limited to a predetermined data size and merely include a specific data string of relevant information to enable the selective call receiver 10 to prepare for the OTA software upgrade page 210. The preferred control page 200 includes the approximate time that the OTA software upgrade page 210 will begin broadcasting and may further include the approximate byte size of the OTA software upgrade page 210. The size of the upgrade program is typically referenced in bits or bytes, but may be delineated by the approximate time required for programming.

Figure 1:
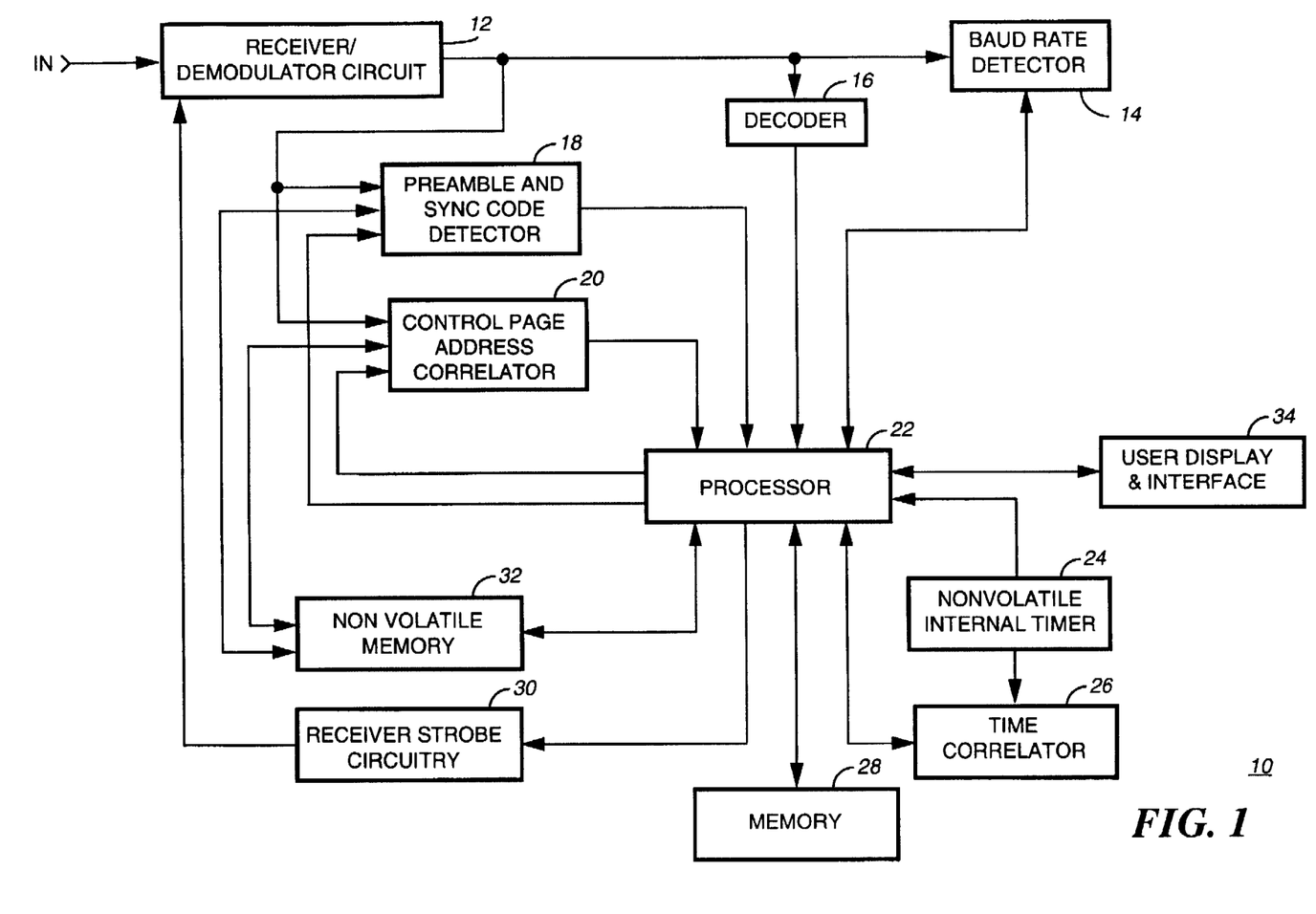
FIG. 1 is a block diagram of a selective call receiver device with OTA software programming architecture in accordance with an embodiment of the instant invention.

With reference to FIG. 1, all selective call signals are received and demodulated by the receiver circuitry 12 and processed if it is of a compatible baud rate. Accordingly, the control page 200 and ultimately the OTA software upgrade page 210 transmissions are received by the selective call receiver 10 and filtered through the receiver circuitry 12 for processing. After demodulating the received selective call signal, that is either the control page 200 or OTA software upgrade page 210, the demodulated word is sent to the preamble and sync code detector 18, to the baud rate detector 14 and to the control page address correlator 20 to determine if a compatible and readable signal is present for further processing. The sync code and baud rate detectors comprise conventional circuitry for receiving, synchronizing and processing selective call signals from conventional synchronous, pseudo-synchronous, and asynchronous protocols, such as POCSAG, FLEX™ and other protocols. The control page address correlator 20 may be a conventional address correlator or may comprise novel features, as discussed herein, for receiving and accepting control pages and OTA software programs. The selective call receiver 10 is adaptable to any protocol because the control page 200 is transmitted and received by the selective call receiver 10 as a conventional message and demodulated to determine compatibility with the receiving device and to store the programming data information. Although the instant invention is preferably implemented with synchronous paging protocols, for purposes of this discussion, the instant invention is described with reference to the POCSAG protocol which is considered a pseudo-synchonous protocol.

In the POCSAG protocol, the control page data word is preceded by a conventional preamble and sync protocol. Other protocols may have a comparable data or bit string, like the preamble, to precede message data strings to prepare the device for receiving messages. The preamble is typically a 576 bit string of one-to-zero transitions and a 32 bit synchronization code word ("sync code") which the device receiver uses to establish synchronization. The control page data word follows the preamble and sync code, and includes the header information and program related data. The header typically includes the control page address of the device being upgraded and the programming related data. The control page address is exclusive to the device and programmed by the controlling company to protect the device from being reprogrammed or changed without authorization. The control page address is compared to the address of the device by the control page address correlator 20 to determine compatibility with the device. The control page address may be a new individual address used exclusively for programing purposes as a password to protect the device or it may be an existing address. Either way it is only known by the device's control center which originates the control page and upgrade, and it is transparent to other users.

Once the baud rate detector 14 determines that a selective call signal of compatible speed is being received, the baud rate detector 14 prompts the processor 22 which initiates control and authorizes further activity of the receiver circuitry 12. The processor 22 prompts the preamble and sync code detector circuitry 18 to begin reading the preamble code and sync code. The preamble and sync code detection and processing involves conventional circuitry and procedures wherein the preamble circuitry reads the demodulated signal and correlates it with a preamble bit pattern known to the preamble detector 20. It should be noted that the sync code detector 18 may comprise any conventional protocol communications matching circuitry known in the art, since the instant invention preferably provides a means for over the air software programming independent of the user and pager activity. Since the preamble typically comprises at least 576 alternating zero-to-one transitions which must be correlated, a conventional battery saving circuit, energized by the processor 22, deactivates the receiver circuitry 12 while the preamble bit pattern is correlated to conserve battery power. Since the synchronization code word follows the preamble bit pattern, the sync code detector 18 is subsequently activated by a signal from the processor 22. The sync code detector 18 correlates the demodulated signal to detect the presence of the sync code and then stores it in nonvolatile memory 32. The sync code detector periodically retrieves the sync code from nonvolatile memory 32 for processing to maintain synchronized communication. Before processing the actual control page message, the selective call receiver 10 must correlate the device address and the target address transmitted in the demodulated selective call signal, when either the control page 200 or OTA software upgrade page 210 is received. Once the central page address correlator 20 receives a start signal from the processor 22, it correlates the address information from the demodulated signal with a predetermined address assigned to the selective call receiver 10 and stored in nonvolatile memory 32. The predetermined address identifies the selective call receiver 10. Again, the correlation of the stored assigned address and the target address may be conventional. The purpose of the control page address correlator 20 is to match the address of the selective call receiver 10 with the selective call signal addresses in the control pages and messages to protect the device from unauthorized or improperly executed software changes. Thus, in addition to conventional address correlators which provide a confirming signal to the processor, the control page address correlator 20 of the instant invention provides a signal to the processor 22 once the control page or OTA upgrade address information is processed indicating whether to receive, process and allow scheduled OTA upgrade or programming pages.

If a proper address correlation is achieved the control page 200 and OTA software upgrade page 210 information will be stored in memory 28. The control page information is saved so that it may be retrieved by the time correlator 26 which compares the program time with a timing signal from nonvolatile internal timer 24 and generates a control signal for transmission to the processor when proper time correlation is achieved. The processor 22 then provides an activation signal to the receiver strobe circuitry 30 which energizes the receiver circuitry 12 in time to receive the OTA software update page 210. The OTA software upgrade page 210 is also stored in memory nonvolatile 32 for programming. The processing of the control page 200 and upgrade 40 is preceded by the processing of the decoder 16 which decodes the demodulated signal and provides the decoded signal information to the processor 22, as conventionally known. It should be noted that the control page may also be stored in an EEPROM location.

In accordance with conventional selective call receiver architecture, the receiver circuitry 12 may sleep while the selective call signal information, including control page time, preamble detection, address, and baud rate information is processed and correlated with the selective call receiver 10 prior to being reactivated. Conventional receiver strobe circuitry 30, or battery saving circuitry, provides a signal to the receiver circuitry 12 to energize or de-energize the receiver circuitry 12 for conserving battery power and extending battery life. The processor 22 provides an energization signal to the receiver strobe circuitry 30 at a preselect time after the sync code is still being processed, affording the receiver circuitry 12 warm-up time. The processor 22 also provides a signal to the receiver strobe circuitry 30 to deactivate the receiver circuitry 12 in response to signals from the sync code detector 18, the control page, the control page address correlator 20, and the baud rate detector 14.

Accordingly, the scope of the instant invention contemplates receiving two distinct but interrelated messages, the control page 200 and the OTA software upgrade page 210. The receiver circuitry 12 receives a control page word 200 for prompting the selective call receiver 10 that an OTA software upgrade, will be implemented at a predetermined time, preferably during off peak hours. The user may also be prompted if an upgrade is to be performed by the selective call receiver 10 with an audible or visible prompt to warn the user. Like other incoming messages, the control page 200 has a message that is preceded by a preamble and sync code, or similar protocol patterns which must be processed and correlated. Upon receiving, demodulating and accepting the control page 200 for processing, the control page message is decoded by the decoder 16 which provides the selective call signal information to the processor. The control page message is like any typical message transmitted to a user. A distinction, however, is that this message is intended for the actual device and is transparent to the user. Thus, it is not placed in user readable format. The control page 200 includes information which provides relevant times of when an OTA upgrade will occur and may also include the anticipated size of the new code being implemented. Providing the OTA program size may aid the device in determining whether the complete OTA upgrade is received based on a predetermined margin of error. The time and new code size data information may be stored in flash RAM 28, RAM, or EEPROM in the processor 22 and extracted for preparing the device for programming. According to the instant invention, a nonvolatile internal timer 24 maintains a relevant time compatible with the scheduled upgrade time so that the selective call receiver can be prepared to receive the new code at the appropriate time.

The instant invention also includes a time correlator 26 which compares the OTA software upgrade programming time with an actual time from the nonvolatile internal timer 24 for anticipating the OTA upgrade. The compared times are typically in the form of signals provided by the processor 22 and nonvolatile internal timer 24. Upon receiving the program time, the processor 22 provides a signal to the time correlator 26 indicating the time of OTA upgrade. The time correlator 26 may store this time for correlating with the actual timer time or it may continually extrapolate the scheduled time from flash RAM or EEPROM. The time correlator 26 may also have a pointer or indexing means for overriding and replacing the scheduled time with a new time. In any event, the time correlator 26 correlates stored upgrade time with the actual time provided by the nonvolatile internal timer 24 until the times match. Once the times correlate, the time correlator 26 provides a signal to the processor 22 prompting the processor 22 to initiate power to the selective call receiver 10 if not already "on" and to energize the receiver circuitry 12. The processor 22 then provides an energization signal to a power circuit not shown and then to the receiver strobe circuitry 30 to activate the receiver circuitry 12. Thereafter, the receiver circuitry 12 sniffs the air looking for the anticipated OTA upgrade message until it is received, demodulated and correlated as previously discussed and shown in FIG. 4. If the OTA new code is received and decoded, it is stored in the memory 28 by the processor 22. The memory 28 is a temporary nonvolatile RAM location for storing the new code. Once the new code is received and stored the processor implements the OTA software upgrade into memory at the designated location as indicated by the OTA message.

As noted, the selective code receiver device includes a nonvolatile internal timer 24. A time signal is generated by the timer and provided to the time correlator 26. The time correlator 26 compares the time signal to the scheduled programming time. When the two times match the pager is prepared for programming. As aforementioned, a signal is provided by the time correlator 26 to the processor 22 which signals the receiver strobe circuitry 30 to provide a signal to activate the receiver circuitry 12. After warm-up, the receiver circuitry 12 sniffs the air for a predetermined or allotted time looking for the OTA software upgrade message 210. The amount of time a selective call receiver 10 looks for an OTA software upgrade may be preprogrammed into the device, or determined by the control page 200. The time correlator 26 keeps track of time spent looking for the OTA software upgrade and will send a sniff termination signal to the processor 22 when the allotted time has elapsed.

A successful transmission and receipt of the control page 200 may be authenticated to confirm that the complete control page data string has been received by the selective call receiver 10. For instance, with two way communications capability, a conventional handshake procedure can be used to confirm. In an alternative embodiment, the control page word may include information at the ends of the data string indicating the size of the control page 200. This information can be appropriately used by the select call receiver 10 to determine whether a complete OTA software upgrade page 210 is received before saving the program. The same may be done for the control page 200. If the complete control page 200 is not received, the selective call receiver 10 may remain activated until the next control page pulse is completely received and stored. The transmittal of the control page size may not be necessary, however, since each control page data word is proceeded by a preamble and 32 bit sync string and since the receiver circuitry 12 is periodically activated by the receiver strobe circuitry 30 in cycles that insure that it is activated in a timely fashion so as to receive the preamble of selective call signals and hence the transmitted selective call signal.

The receiver circuitry 12 is activated and deactivated to conserve battery time. During the de-energized state, the receiver circuitry is not powered or activated to receive transmissions. The receiver sleep time is, however, less than the preamble period of any transmitted messages so that the receiver circuitry 12 is always activated in time to detect the presence of a signed preamble. When a preamble is detected, the device demodulates the preamble and follows the previous routine of ascertaining the proper baud rates for compatibility. If compatible, the system demodulates the selective call signal and pulls the page address to determine correlation. If the page address matches the address of the device, then the OTA software upgrade program is downloaded in memory and the device returns to its previous mode. If the selective call signal is a control page then the data may also be stored in memory.

The memory 28 of the instant invention is a temporary nonvolatile memory to store the new code received via the OTA software transmission for programming the selective call receiver upgrade. It may also be used to temporarily store the control page message.

The method of transmission, receiving and decoding is dependant on the device and protocol. For instance, the POCSAG protocol transmits a 576 bit preamble, 32 byte sync code and data batches, which include 8 frames per batch. If the baud rate of the preamble correlates to the baud rate of the device, then the control page 200 is received. As will be appreciated by skilled artisans, each device is programmed to store its address in one of the 8 frames with a most significant bit (MSB) of "0." The MSB for data strings is "1." When the processor correlates the control page data word address with the device control page address it first checks for the proper frame designation. That is, if the frame designation matches, then a bit to bit comparison is performed. After the control page address is confirmed, then the device receives, decodes and stores the control page data information of which is included the time and size of the upgrade code. The time and size data may be stored in memory as previously noted.

Figure 2:
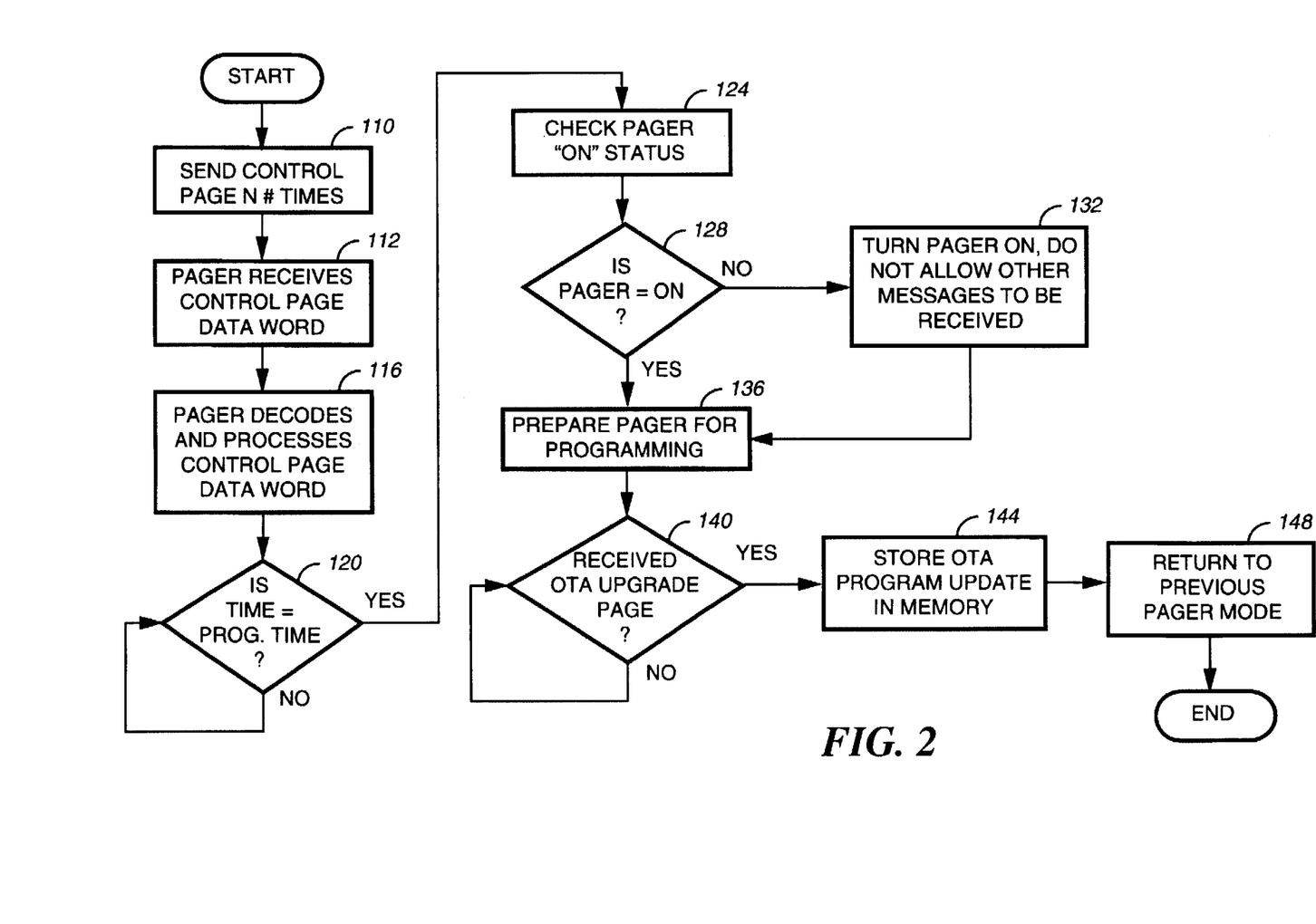
FIGS. 2 and 3 are flow charts of the operation of the selective call receiver with OTA software programming in accordance with an embodiment of the instant invention.
Figure 3:
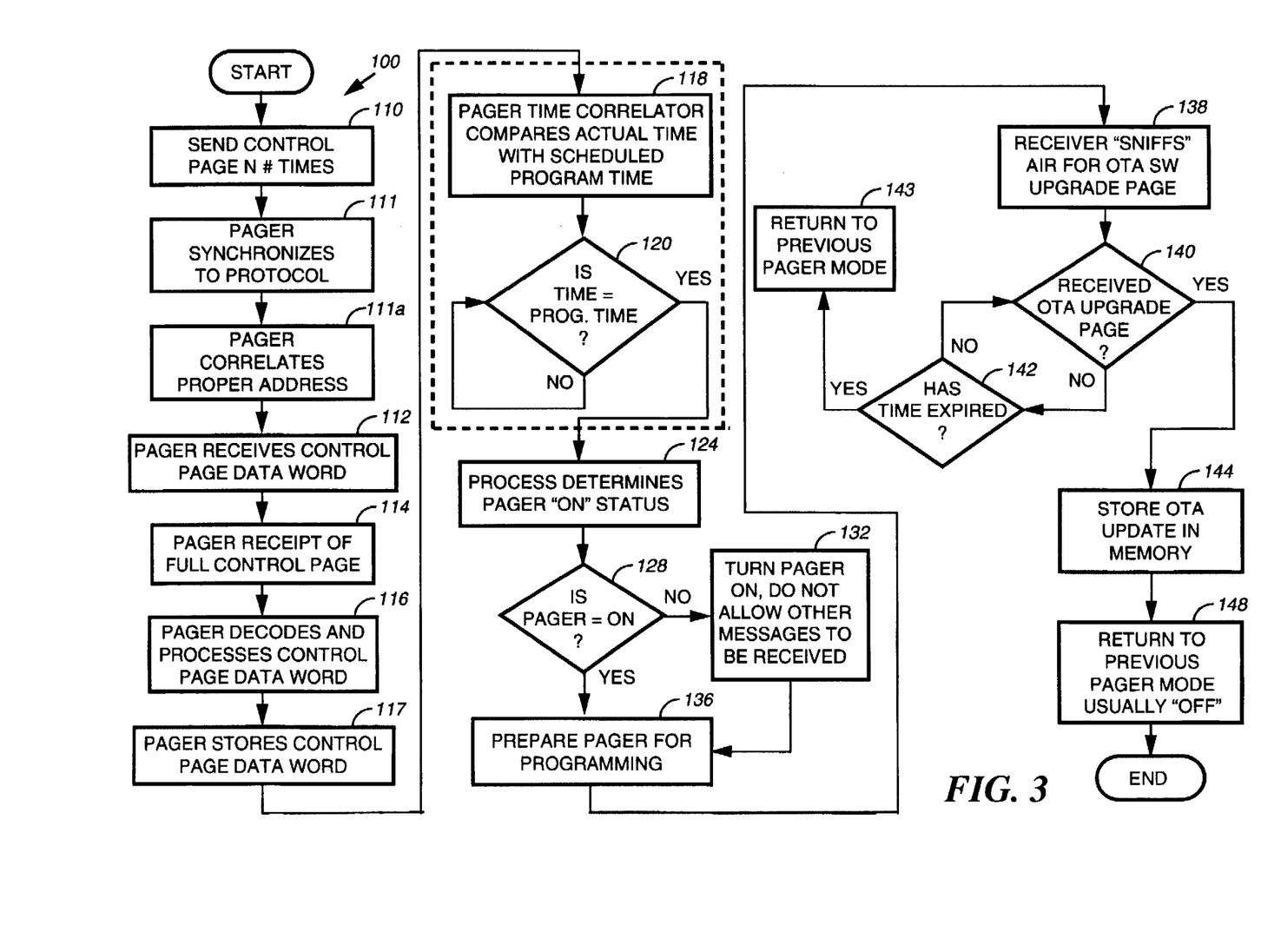

In accordance with FIGS. 2 and 3, the instant invention provides a method (100) for automatically receiving an OTA software upgrade page 210 in the form of selective call signals at predetermined times and transparent to the selective call receiver user/owner so that the selective call receiver may be placed in the "off mode" to conserve and extend battery life without missing the OTA software upgrade page. The instant invention generally comprises the steps of sending and receiving a first selective call signal or control page 200, having program time data, a predetermined number of times (110); decoding, processing, and detecting programming related information such as time; storing this control page information in the targeted selective call receiver (112, 116); comparing the stored programming time with a timing signal generated by nonvolatile internal timer 24; activating the selective call receiver automatically at the preselected time indicated by a control pager related signal (120–136); receiving the OTA software upgrade code; and storing it in the memory of the device (140–148).

During a predetermined time of day, while most selective call receivers are active, a series of control page data words are sent from the device's control center, or some other location, a predetermined number of times, as shown in FIG. 4 (110). The selective call receiver 10 receives the control page data word via its receiver and demodulator circuitry 12, demodulates the control page 200, and processes the transmitted information (112–116). The selective call receiver 10 processes the control page data word, as previously discussed, by processing the preamble and sync code, verifying correlation, and decoding the received control page data word. The time, and possibly expected new code size, is stored in either program memory for subsequent retrieval and correlation. According to FIG. 2 (120), the actual time or time signal generated by the nonvolatile internal timer 24 is correlated with the programming time provided by the control page information until a match is achieved or determined. Once the time correlator 26 responds in the affirmative with a correlated time, it sends a signal to the processor to check the pager's "on" status and to prepare for OTA programming (124, 128). If the selective call receiver, or pager, is not in the "on" mode, then the processor provides a signal to the power enabling circuitry until receiving a de-energizing signal so that the OTA upgrade may be received (128–132). If the selective call receiver is already powered, then the processor sends an activate signal to the receiver strobe circuitry 30, thereby activating the receiver for receiving the expected OTA upgrade message (128–136). The selective call receiver is then prepared for receiving the OTA software upgrade page 210. The processor 22, thereafter, maintains the receiver circuitry 12 in the active mode until the expected OTA upgrade message is received (140–143). In accordance with the instant invention, it is important to note that the processor 22 only allows the selective call receiver to be activated for receiving the expected OTA upgrade message and no other pages pursuant to the signal request from the time correlator 26 or the information provided by the control page data word in flash RAM 28.

The processor 22 keeps the receiver alive to receive the expected OTA software upgrade page for a predetermined amount of time. The predetermined receiver activity or sniff time is processed and correlated by time correlator 26 with the actual time provided by the nonvolatile internal timer 24. Once the allotted time for looking elapses, as determined by the time correlator 26, then the device is de-energized to conserve battery power and it returns to its previous pager mode. Upon receiving the OTA upgrade message, the processor stores the new code program in program flash RAM 26 (144). The processor then programs the device with the new code or data transmitted in the OTA software upgrade in accordance with the information provided. Once the programming is complete, the selective call receiver is de-energized in accordance with a signal provided by the processor 22, and returned to its previous pager mode (148).

What is claimed is:

1. A method for performing over-the-air software programming of a selective call receiver which can be switched off at any time by a user, the over-the-air software programming being independent of and transparent to an action by the user, the selective call receiver comprising receiver circuitry for receiving and demodulating selective call signals, said method comprising the steps of:
    (a) receiving a first selective call signal intended for the selective call receiver;
    (b) detecting, within the first selective call signal, predetermined programming related information which includes an anticipated time of transmission of a second selective call signal;
    (c) preparing the selective call receiver to receive the second selective call signal in response to the programming related information;
    (d) receiving the second selective call signal in response to said step of preparing at the anticipated time of transmission of the second selective call signal; and
    (e) switching the selective call receiver on at the anticipated time of transmission of the second selective call signal to receive the second selective call signal when the user has switched off the selective call receiver prior to the anticipated time.

2. The method of claim 1, wherein said step of preparing comprises energizing the receiver circuitry at the anticipated time of transmission of the second selective call signal while the selective call receiver is switched on.

3. The method of claim 1, wherein said step of detecting predetermined programming related information comprises the steps of:
    decoding the first selective call signal to extract the predetermined programming related information; and
    storing the predetermined programming related information after the step of decoding.

4. The method of claim 1, wherein the second selective call signal includes software upgrade information, and wherein the method further comprises the step of storing the software upgrade information which is received.

5. The method of claim 1, wherein the anticipated time of transmission is during off-peak hours.

6. A selective call receiver which can be switched off at any time by a user, and which can be programmed over-the-air independent of and transparent to an action by a user, the selective call receiver comprising:

receiver circuitry for receiving and demodulating selective call signals, including a first selective call signal which delivers programming related information which includes an anticipated time of transmission of a second selective call signal;

a processor, coupled to said receiver circuitry, for detecting the anticipated time of transmission of the second selective call signal within the programming related information;

timing control means, coupled to said processor, and responsive to the anticipated time of transmission for generating a control signal in response to an occurrence of the anticipated time of transmission of the second selective call signal; and energizing circuitry, for selectively energizing said receiver circuitry in response to said control signal for enabling receiving and demodulating the second selective call signal, said energizing circuitry further for switching on the selective call receiver and selectively energizing said receiver circuitry for enabling receiving and demodulating the second selective call signal when the user has switched off the selective call receiver prior to the anticipated time.

7. A selective call receiver according to claim 6, further comprising a decoder, coupled to said receiver circuitry and said processor decodes the programming related information in the first selective call signal, and software upgrade information in the second selective call signal, said decoder providing the programming related information and the software upgrade information to said processor.

8. A selective call receiver according to claim 7, wherein said timing control means comprises:

a timer for producing a timing signal; and comparing means, coupled to said processor and said timer, for receiving the timing signal and for comparing the timing signal with the anticipated time to generate the control signal.

9. A selective call receiver according to claim 8, further comprising a memory coupled to said processor, for storing the anticipated time of transmission and the software upgrade information.

10. A selective call receiver according to claim 9, further comprising a page address correlator, coupled to said receiver circuitry, for comparing an address with address related information in the first and second selective call signals to determine correlation between the first and second selective call signals and the selective call receiver.

11. The method of claim 6, wherein the second selective call signal includes software upgrade information, and wherein the method further comprises the step of storing the software upgrade information which is received.

12. The method of claim 6, wherein the anticipated time of transmission is during off-peak hours.

\* \* \* \* \*